(12) United States Patent
Rosener

(10) Patent No.: US 8,972,739 B1
(45) Date of Patent: Mar. 3, 2015

(54) METHODS AND SYSTEMS FOR SECURE PASS-SET ENTRY IN AN I/O DEVICE

(75) Inventor: Douglas K Rosener, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 1182 days.

(21) Appl. No.: 11/809,558

(22) Filed: Jun. 1, 2007

(51) Int. Cl.
*H04L 29/06* (2006.01)

(52) U.S. Cl.
USPC .......................................................... 713/182

(58) Field of Classification Search
USPC ......................... 713/168, 182, 186; 726/5, 4
See application file for complete search history.

(56) References Cited

U.S. PATENT DOCUMENTS

| | | | |
|---|---|---|---|
| 5,737,393 A | 4/1998 | Wolf | |
| 6,115,513 A | 9/2000 | Miyazaki et al. | |
| 6,527,171 B1 | 3/2003 | Brooks et al. | |
| 6,549,194 B1 | 4/2003 | McIntyre et al. | |
| 6,630,928 B1 | 10/2003 | McIntyre et al. | |
| 7,188,314 B2 | 3/2007 | Mizrah | |
| 7,694,138 B2* | 4/2010 | O'Gorman et al. | 713/168 |
| 2004/0037016 A1 | 2/2004 | Kaneko et al. | |
| 2004/0054935 A1* | 3/2004 | Holvey et al. | 713/202 |
| 2004/0177097 A1* | 9/2004 | Yu et al. | 707/104.1 |
| 2004/0225880 A1 | 11/2004 | Mizrah | |
| 2005/0044425 A1* | 2/2005 | Hypponen | 713/202 |
| 2006/0252470 A1* | 11/2006 | Seshadri et al. | 455/575.2 |
| 2007/0198847 A1* | 8/2007 | Watari | 713/184 |
| 2007/0266428 A1* | 11/2007 | Downes et al. | 726/5 |
| 2008/0052245 A1 | 2/2008 | Love | |
| 2008/0098464 A1* | 4/2008 | Mizrah | 726/5 |
| 2008/0235788 A1* | 9/2008 | El Saddik et al. | 726/18 |
| 2010/0156596 A1* | 6/2010 | Herder | 340/5.82 |

OTHER PUBLICATIONS

Gregory, Peter; Doria, Tom; Stegh, Chris; Su, Jim; SIP Communications for Dummies, Avaya Custom Edition, 2006, Wiley Publishing, Inc., Hoboken, NJ, USA.

* cited by examiner

*Primary Examiner* — Ali Abyaneh
(74) *Attorney, Agent, or Firm* — Chuang Intellectual Property Law

(57) ABSTRACT

Systems and methods for securely entering pass-sets in input/output (I/O) devices. An exemplary I/O device includes an authentication application, an output interface and a user-controls interface. The authentication application is configured to generate aural, visual, audiovisual or tactile messages containing one or more pass-set entry menus, in response to a request to access a pass-set protected resource by a user of the I/O device. The output interface is configured to securely present the generated messages for the user. For example, the headphone of a headset can securely present an aural message to a wearer. The user-controls interface is configured to assist the user in making a selection from the menus or choices presented to the user. For example, a variety of controls, switches and buttons on a headset can facilitate user input. The user selection is then assembled into a user entered pass-set for authenticating the user's identity by an authenticator.

15 Claims, 17 Drawing Sheets

| | Menu 1 | Menu 2 | .. | Menu N |
|---|---|---|---|---|
| Item #a | 18 | 1 | .. | 14 |
| Item #b | 13 | 3 | | 6 |
| .. | .. | .. | .. | .. |
| Item #m | 0 | 17 | | 8 |

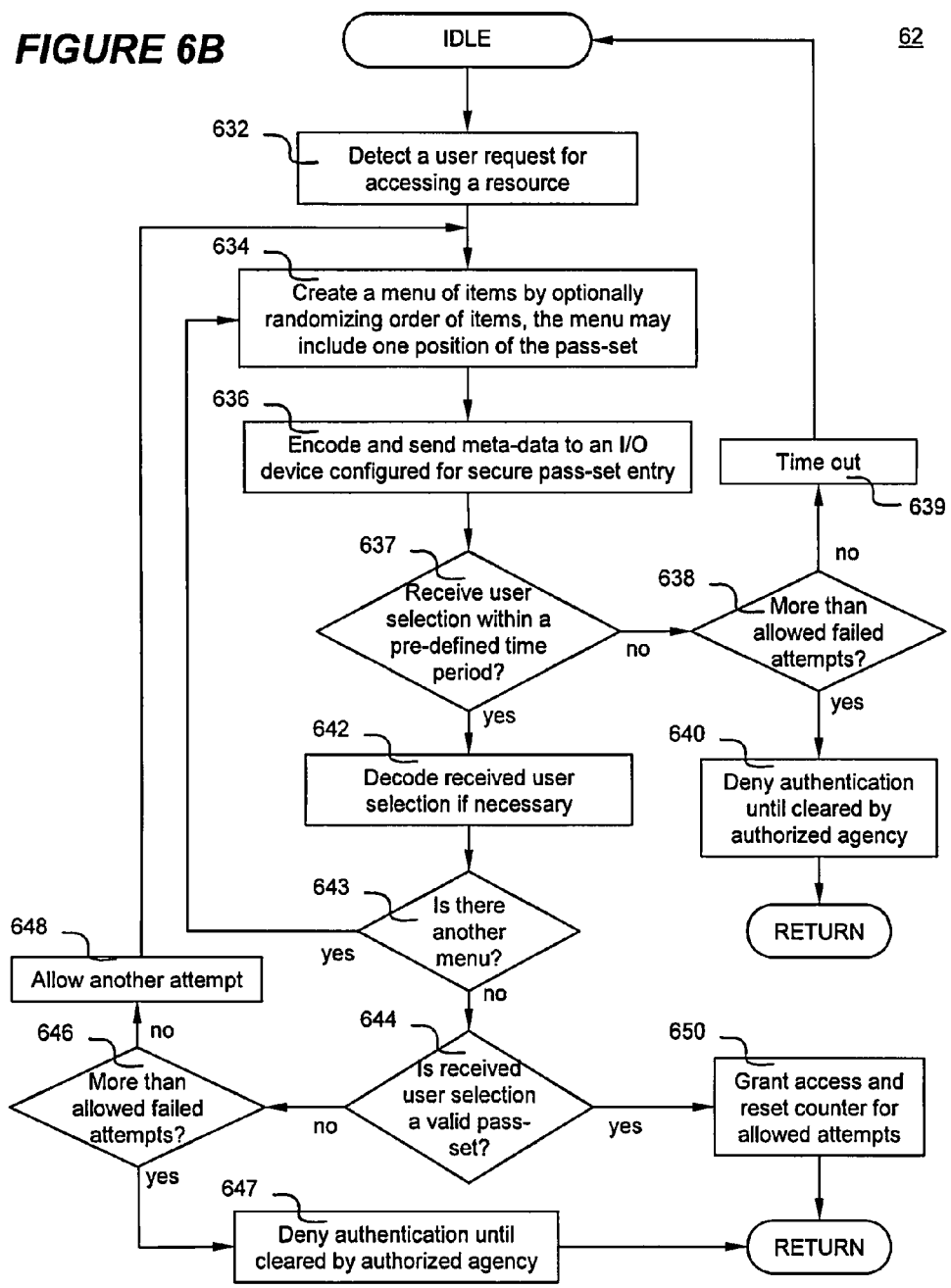

METHODS AND SYSTEMS FOR SECURE PASS-SET ENTRY IN AN I/O DEVICE

FIELD OF THE INVENTION

The present invention generally relates to authentication of users for access to resources protected by passwords (i.e., more generally pass-sets), and more particularly to systems and methods for securely entering pass-sets in input/output (I/O) devices.

BACKGROUND OF THE INVENTION

A pass-set is a form of secret authentication data that is used to control access to a resource, thereby providing security. Each time a user wishes to use the resource the user is asked to enter the pass-set. If the entered pass-set is valid, the user is permitted to access the resource, otherwise access is denied.

Pass-set entry requirements are used in a variety of applications. For example, a typical computer user if required to enter pass-sets for a wide variety of purposes, such as logging in to a computer account, retrieving e-mail from servers, accessing certain files, databases, networks, web sites, etc. In banking applications, a bank account holder is required to enter a personal identification number (PIN), in order to access an automated teller machine (ATM) to conduct a banking transaction.

Pass-sets generally contain a string of data including numerical digits, upper/lower case alphabetical characters, and other typeable symbols. Preferably, from a security perspective, the string of data for any given pass-set contains as random a sequence of digits, characters and symbols as possible. While random like sequences are more secure, they are often difficult for users to remember, and users often change the pass-set to something that is easier to remember, for example, the name or other descriptive characteristic of a family member (e.g., a birth date). Unfortunate consequences of simplifying the pass-set, however, are that the pass-set becomes more susceptible to being cracked by a hacker, and the security of the resource becomes compromised.

A pass-set should be kept secret by those who are entitled to access the resource so that secure access of the resource can be maintained. This is easy while users are not accessing the resource. However, the users must reveal the pass-set, to some degree, when requesting access to a resource. While revealing the pass-set may only be for a brief moment in time, it does, nevertheless, render the pass-set vulnerable to being stolen. One of the typical methods to enter the pass-set before accessing the resource is to type in the pass-set from a device such as a keyboard, a number pad, push buttons on a telephone, or the like. Another method is to enter the pass-set verbally into a system that recognizes human voices. A problem with both of these approaches is that an eavesdropper may steal the pass-set by watching or listening to the pass-set being entered. The stolen password then allows the resource to be accessed illegitimately. These problems are compounded by the availability of state-of-the-art keystroke recording and voice recording virus software on computers, since they provide perpetrators the means to pick up the pass-set even if a user is very careful when entering the pass-set. For example, typing in with a shield covering the keyboard or speaking with a low voice would not be a defense against such virus software.

Entering a pass-set is one factor of authentication (something you know). Another factor (something you are) includes using biometrics such as fingerprints, retinal scanning, facial recognition, hand geometry of a user. While these authentication approaches do provide some degree of security, they also have limitations. For example, using biometrics to match the identity of a user against a pre-stored database can be unreliable. False acceptance and false rejection have been topics debated in the field of biometrics. Biometric properties may also be falsified, for example, a perpetrator may create a false identification by lifting a fingerprint from a glass held by a legitimate user to access the resource illegitimately.

It would be desirable, therefore, to have systems and methods that allow users to securely enter pass-sets for accessing resources without the risk of revealing the pass-sets to others.

BRIEF SUMMARY OF THE INVENTION

Systems and methods for secure pass-set entry in an input/output (I/O) device are disclosed. An exemplary I/O device includes an authentication application, an output interface and a user-controls interface. The authentication application is configured to generate aural, visual, audiovisual or tactile messages containing one or more pass-set entry menus, in response to a request to access a pass-set-protected resource by a user of the I/O device. Each of the one or more pass-set entry menus includes one or more items. The order of the items may be randomized when generated. The output interface is configured to securely present the generated messages for the user to listen to and/or to view. One exemplary output interface comprises a headphone of a headset, in which only a wearer of the headset can hear presented pass-sent entry menus or choices. A user-controls interface is configured to assist the user in making a selection in each of the one or more pass-set entry menus. According to another embodiment, the user-controls interface comprises a microphone and a speech recognition system, which enable the user to verbalize a selection. Then selections from the user-controls interface are then assembled into a user entered pass-set for authenticating the user's identity by authenticators that control pass-set-protected resources.

Since messages representing pass-set entry menus are securely presented to the user, and the user can make selections from the menus by the item number without revealing the real data content of the pass-set, the problems and shortcomings of prior art approaches are overcome.

According to one aspect of the invention, a secure pass-set entry process is performed between a remote authenticator (e.g., a computing device, personal digital assistant (PDA), cellular phone, etc.) and a user using a local I/O device (e.g., a headset, a personal heads-up display device, etc.) in a remote-local-based system. According to another aspect, a secure pass-set entry process is conducted in an I/O device that is also an authenticator (referred to herein as a "local-only system").

Further features and advantages of the present invention, as well as the structure and operation of the above-summarized and other exemplary embodiments of the invention, are described in detail below with respect to accompanying drawings in which like reference numbers are used to indicate identical or functionally similar elements.

BRIEF DESCRIPTION OF THE DRAWINGS

FIG. 6B is a flowchart illustrating an exemplary process by which the authenticator in FIG. 5B operates to authenticate a user, in response to the user's request to access the resource, according to an embodiment of the present invention;

DETAILED DESCRIPTION

Figure 1A:
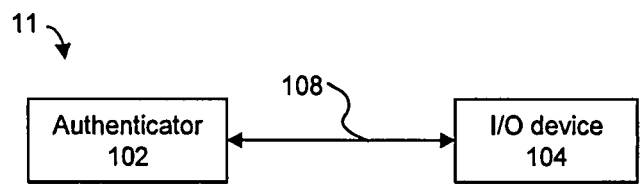
FIG. 1A is a diagram of an exemplary system for secure pass-set entry for a user of a local I/O device and a remote authenticator over a wired link, according to an embodiment of the present invention.

Referring first to FIG. 1A, there is shown a secure pass-set entry system 11, according to an embodiment of the present invention. The secure pass-set entry system 11 comprises an authenticator 102 and an input/output (I/O) device 104. The authenticator 102 is configured to authenticate a user, when the user requests an access to resources under the authenticator's control. The I/O device 104 is configured to provide a secure environment for the user to enter a pass-set for the authentication. The authenticator 102 may comprise, for example, a computing device, cellular phone, a personal digital assistant (PDA), etc. The I/O device 104 may comprise a headset, a personal heads-up display (HUD) device, some form or combination of a headset and HUD, a haptic device, or any suitable device for presenting and receiving pass-set entry related information.

Figure 1B:
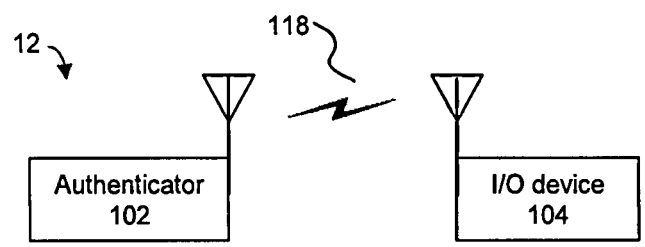
FIG. 1B is a diagram of an exemplary system for secure pass-set entry for a user of a local I/O device and a remote authenticator over a wireless link, according to an embodiment of the present invention.

According to one embodiment of the invention, data communication between the I/O device 104 and the authenticator 102 is transmitted via a wired link 108 (e.g., a Universal Serial Bus (USB)) as shown in FIG. 1A. According to another embodiment, shown in FIG. 1B, the data communication is transmitted via a wireless link 118, for example, a Bluetooth wireless link, a Wi-Fi (IEEE 802.11) wireless link, a Wi-Max (IEEE 802.16) link, a cellular communications wireless link, or other wireless communications link, etc. The I/O device 104 is referred to as a "local" device, and the authenticator 102 as a "remote" device, since the user enters the pass-set in a local device and authentication is typically performed by a device that is remote to the I/O device.

Figure 1C:
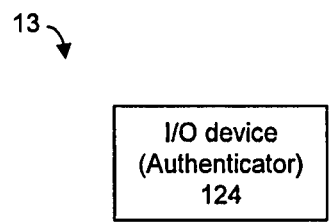
FIG. 1C is a diagram of an exemplary system for secure pass-set entry for a user of a local I/O device, which is also an authenticator, according to an embodiment of the present invention.

In the remote-local-based systems 11 and 12, an authentication application is installed on either or both of the remote authenticator 102 and the local I/O device 104. In contrast to the remote-local-based systems, FIG. 1C shows a local-only system 13 for secure pass-set entry, according to another embodiment of the invention. The local-only system 13 comprises an I/O device 124 that is also an authenticator. For example, an intelligent headset may need to be authenticated before a user can use the headset. Since there is only one device in the local-only system, an authentication application is installed on the I/O device 124. While the term "headset" has various definitions and connotations, for the purposes of this disclosure, the term is meant to refer to either a single headphone (e.g., a monaural headset) or a pair of headphones (e.g., a binaural headset), which include(s) or does not include, depending on the application and/or user-preference, a microphone that enables voice recognition.

Figure 2A:
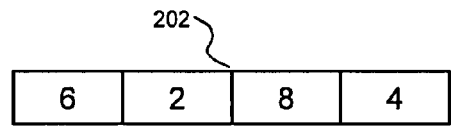
FIGS. 2A-2C are diagrams showing various exemplary pass-sets.
Figure 2B:
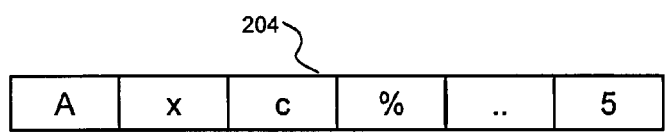

Referring now to FIGS. 2A-2H, for the purposes of clarifying this disclosure, the terms "pass-set", 'position", "element", "item data", "item number", "item order", "directly referenced item data', "indirectly referenced item data", and "pass-set entry menu" are defined and described. A pass-set is defined as comprising one or more positions of elements. When each of the positions contains only numerical digits (i.e., 0-9) as shown in FIG. 2A, the pass-set is often referred to as a PIN 202 such as those used for accessing an ATM in a banking transaction. More commonly on personal computers and internet access, a pass-set may contain a data string 204 as shown in FIG. 2B, each of the positions of the pass-set is a character including alphabets, numbers and/or special symbols. The pass-set 204 has in general N (N is a positive integer greater or equal to 1) positions. In the exemplary pass-set 204 shown, position 1 contains element 'A', position 2 element 'x', and so on. This type of pass set is usually referred to as a "password".

Figure 2C:
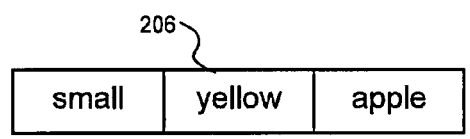

In a more complex form, elements of a pass-set may include words instead of characters. For example, there are three positions with respective elements: "small", "yellow", and "apple" in an exemplary pass-set 206 as shown in FIG. 2C. To expand from this concept, the elements of a pass-set may comprise objects other than words. For example, the elements may include music notes, music snippets, pictures, video snippets, etc. Pass-sets of these types allow a user or person to memorize much easier than an arbitrary data string used in prior art approaches.

According to one aspect of the invention, the authentication application allows a user of the I/O device to enter pass-set securely by generating one or more pass-set entry menus. Each of the menus includes at least one item for the user to make a selection. The order of the items in each menu can be randomized when generated to improve security. The user selection (e.g., item number of the selected item) is then assembled to form a user entered pass-set. The menus are securely presented to the user via aural, visual or audiovisual messages in the I/O device, so that the menus cannot be overheard or seen by others.

Figure 2D:
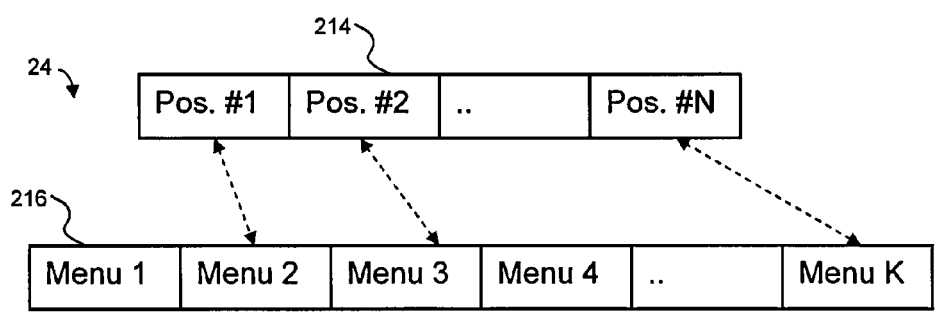
FIG. 2D is a diagram illustrating the relationship between pass-set entry menus and positions of a pass-set.

FIG. 2D shows a relationship 24 between an exemplary pass-set 214 and a set of pass-set entry menus 216. Each position of the pass-set 214 corresponds to one of the pass-set menus 216. However, not every menu corresponds to a position of the pass-set 214. This scheme is designed to increase security because it would be more difficult for a perpetrator to guess the pass-set. In other words, the relationship 24 between the pass-set entry menus 216 and positions of the pass-set 214 may not be one-to-one. However, it is evident, based on the relationship 24, that the number of the pass-set entry menus 216 must be equal to or great than the number of the positions of the pass-set 214.

Figures 2E, 2F:
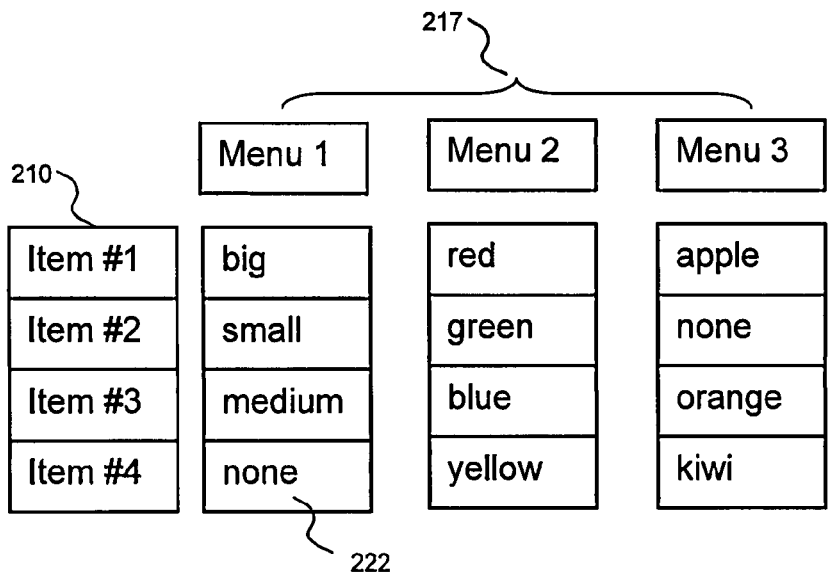
FIG. 2E is a diagram illustrating an exemplary order independent pass-set entry menu with directly referenced item data.
FIG. 2F is a diagram illustrating an exemplary pass-set entry menu with indirectly referenced item data (i.e., numerical indices for item data)

Referring to FIG. 2E, there is shown an exemplary set of three pass-set entry menus 217, each having four items 210. When each of the menus 217 is presented to a user, the user makes a selection of one of the items 210. For example, the items in Menu 2 are item number 1 'red', 2 'green', 3 'blue' and 4 'yellow'. Instead of using numerical item numbers, the item number may also be in different forms such as alphabets (e.g., a, b, c and d) or other suitable means to identify the item itself. Although the number of items in this exemplary set of menus 217 is constant (i.e., four), the number of items may be different for each menu. In addition, the number of items may be any positive integer greater than one.

Assuming the pass-set 206 of FIG. 2C is the correct pass-set stored in an authenticator, a user would only be authenticated only if the user had selected item #2 'small' in Menu 1, item #4 'yellow' in Menu 2, and item #1 'apple' in Menu 3. The item "none" 222 in Menu 1 is designed for those menus that do not correspond to any position of the pass-set.

To generate pass-set entry menus from an authentication application, the authenticator possesses all of the information for the authentication. Meta-data or meta-information for generating each of the one or more pass-set entry menus are transmitted to the local I/O device. The meta-data comprises the relationship between pass-set entry menus and the position of the pass-set, how many items, order of the items, item data. The item data may be directly or indirectly referenced. The number of items in a pass-set entry menu may be varied and the order of the items is optionally randomized when the authentication application creates the menu. As a result, the menu presented to the user may be different each time, even if the menu is meant for entering a selection of a same position in a pass-set. These features may render the overseen or heard user's selection useless because the menu may be presented with different number of items in a totally different order.

Because item data in each of the menus are securely presented to the user with aural, visual or audiovisual messages, each of the item data must be in a playable format (e.g., waveform audio format (".wav file"), QuickTime movie file (".mov file")). One technique is to store the item data in the playable format (i.e., directly referenced) on the authenticator then transmitting to the I/O device. Alternatively, the item data may be stored as non-playable forms (e.g., text file, phoneme file, etc. The playable format of the item data is then generated in the I/O device from the received corresponding text file (e.g., text-to-speech (TTS)).

Figure 2G:
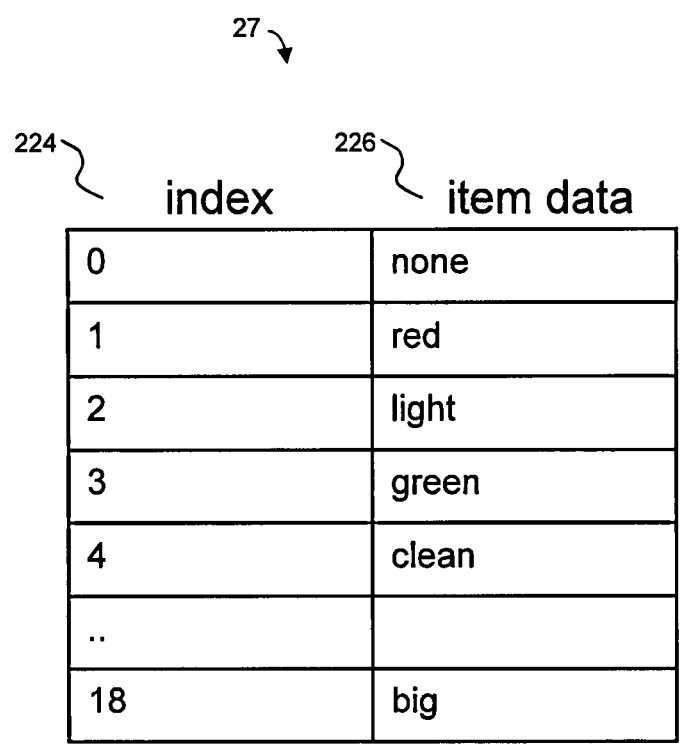
FIG. 2G is a table showing an exemplary lookup table or map for converting indirectly referenced item data to a directly referenced item data.

Alternatively, the item data may stored as numerical indices 223 (i.e., indirectly referenced) in the pass-set entry menus 218 as shown in FIG. 2F. After the numerical indices are received in the I/O device, a lookup table 27, as shown in FIG. 2G, is used to dereference the numerical indices 224 into item data 226. The playable format of the item data can then be generated.

When more than one pass-set entry menus are presented to a user, the menus can be order independent or dependent. The order dependent pass-set entry menus are explained using an example in FIG. 2H, in which a first menu (Menu 1) for the user to select includes items such as "animal", "vegetable", "mineral", etc. The correct selection is "animal" 232. A second menu (Menu 2) is then presented to the user with choices "mammal", "insect", and "fish". The correct selection is "fish" 234. A third menu (Menu 3) and a fourth menu (Menu 4) are presented in similar manner. When selected items (i.e., "animal" 232, 'fish" 234, "Salt water" 236 and "tuna" 238) are all valid, the user will be authenticated.

Figure 3A:
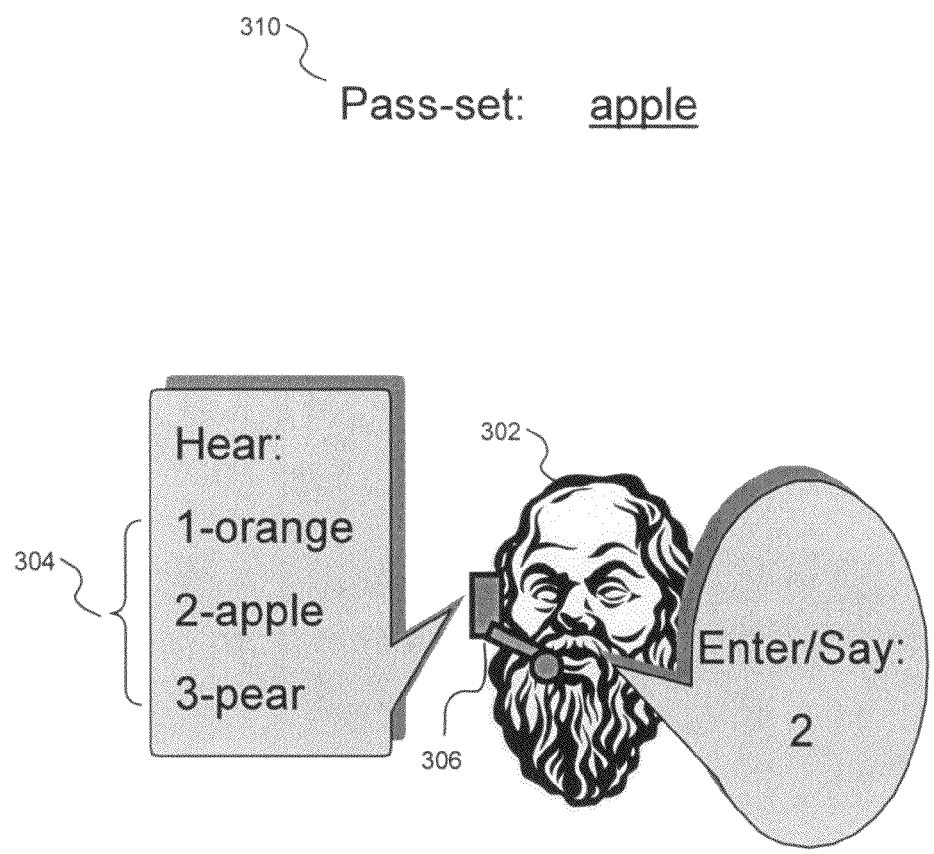
FIGS. 3A-3C are diagrams showing three exemplary methods by which a user selects an item from a pass-set entry menu, according to an embodiment of the present invention.
Figure 3B:
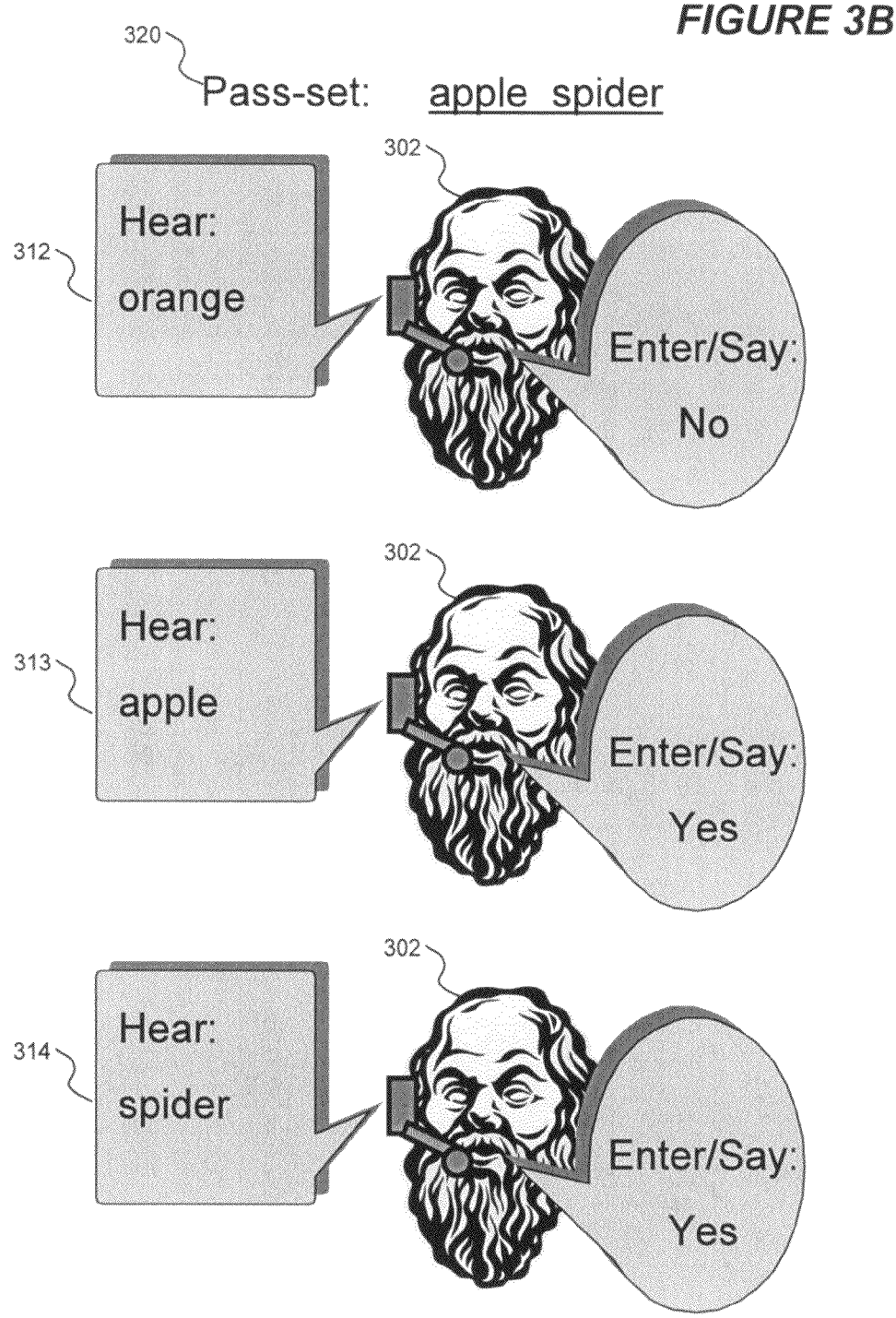
Figure 3C:
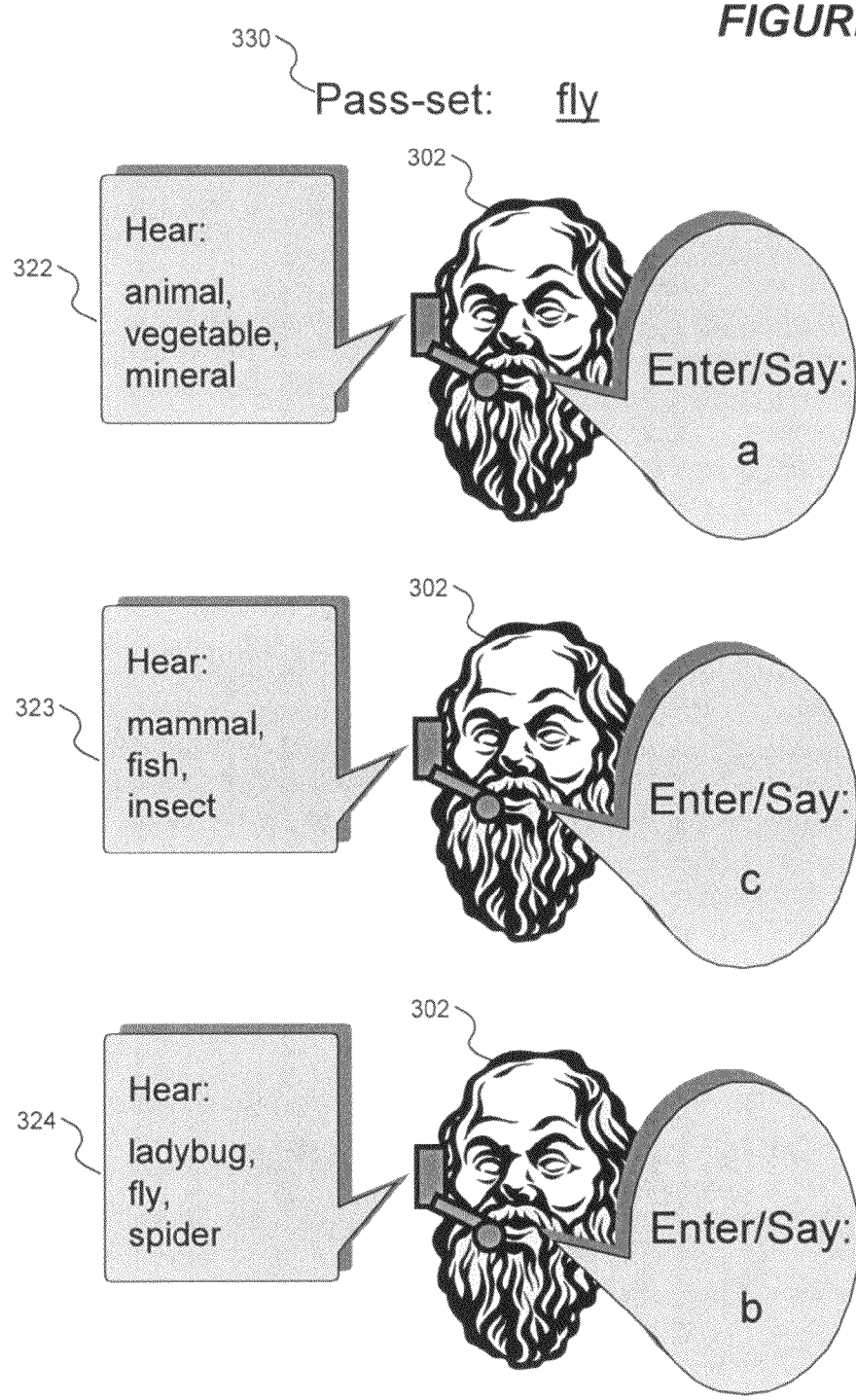

Referring to FIGS. 3A-3C, there are shown three different manners by which a user selects an item from a pass-set entry menu, according to embodiments of the present invention. In FIG. 3A, a user 302 hears an aural message containing a pass-set entry menu 304 including three items: "1-orange", "2-apple" and "3-pear" via a headphone of a headset 306 (i.e., I/O device). The user 302 will be authenticated if the user 302 says or enters choice or item "2" (i.e., "apple"), because the valid pass-set 310 contains one position with the element "apple". Because the aural message can only be heard by the user 302 via the headphone of the headset 306, a perpetrator would not know what item "2" represents thereby the pass-entry is secured.

Another exemplary pass-entry method is shown in FIG. 3B. The valid pass-set 320 has two positions with elements: "apple" and "spider". The user 302 will be authenticated if the user makes three correct selections to all of the pass-set entry menus 312, 313 and 314 presented. Each of the respective menus contains one item in the following order: "orange", "apple" and "spider". Therefore, the correct selections are "no", "yes" and "yes" to the respective menus.

FIG. 3C shows another exemplary pass-entry method, in particular, the user 302 enters pass-set from a set of order dependent pass-set entry menus. A first pass-set entry menu 322 contains three items: "animal", "vegetable" and "mineral". Since the correct selection is "animal", the user 302 must select "a" or first item (i.e., "animal") in order to be authenticated. After the selection is made from the first pass-set entry menu 322, a second pass-set entry menu 323 is presented to the user 302. Similarly, the user 302 selects one of the items: "mammal", "fish" or "insect". The correct choice for the second pass-set entry menu 323 is "c" (i.e., "insect"). Finally, a third pass-set entry menu 324 is presented. The user 302 selects item "b" representing "fly", which is the correct pass-set 330, hence authenticated.

Figure 4:
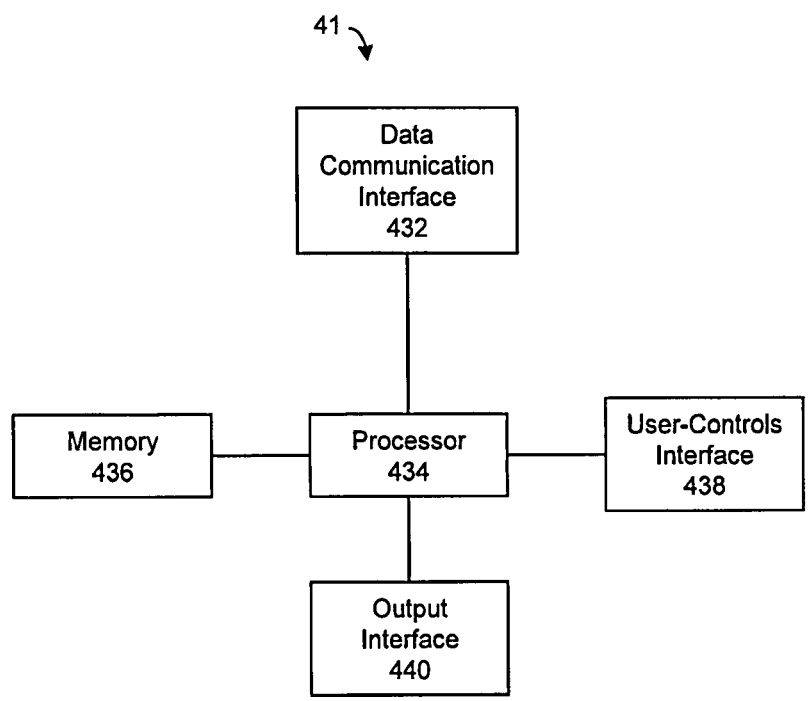
FIG. 4 is a diagram illustrating salient components of an exemplary I/O device for secure pass-set entry, according to an embodiment of the present invention.

While the exemplary methods shown in FIGS. 3A-3C are described for a headset 306, other personal devices that allow securely presenting aural, visual or audiovisual messages can be substituted to achieve the goals of the present invention. In FIGS. 3A-3C, the user 302 makes a selection using a user-controls interface of an I/O device 41 as shown in FIG. 4. According to one embodiment of the present invention, the I/O device 41 comprises a processor 434, to which a data communication interface 432, a memory device 436, a user-controls interface 438, and an output interface 440 are coupled.

The data communication interface 432 is configured to provide data transmission to and from a remote authenticator. The processor 434 together with a pass-set authentication application installed thereon and the memory device 436 are configured to generate output messages containing the one or more pass-set entry menu. The output messages may be aural, visual or audiovisual. The output interface 440 is configured to securely present the generated output messages in such way that only the user of the I/O device 41 can see or hear. For example, a headphone of a headset allows aural messages only for a user to listen to. A personal heads-up display may be incorporated in a visor or helmet only for the wearer to view. One or more haptic devices may also or alternatively be used to present pass-entry choices or menus in tactile form to the user (e.g., by vibrating the I/O device).

The user-controls interface 438 is configure to facilitate a user to traverse each of the pass-set entry menus presented in the output interface 440 and to confirm a selection of an item from the menu. The user-controls interface 438 may comprise a variety of switches, buttons and other controls, for example, mechanical button, slide switch, touch sense control, mouse, keyboard, voice recognition system with a microphone, motions sensor (nodding head for yes), or other interfaces that recognize user's intention to make a selection from a pass-set entry menu.

Figure 5A:
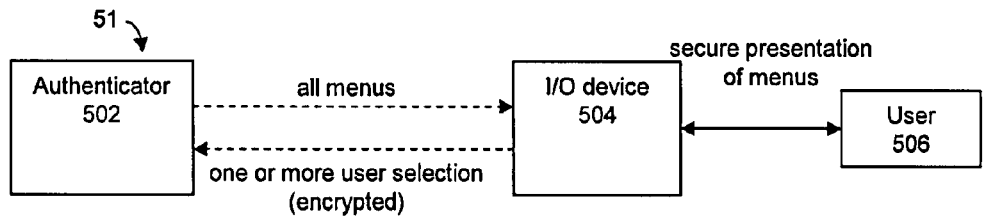
FIG. 5A is a diagram showing a first exemplary remote-local-based system for secure pass-set entry using one or more order independent pass-set entry menus, in accordance with an embodiment of the present invention.
Figure 5B:
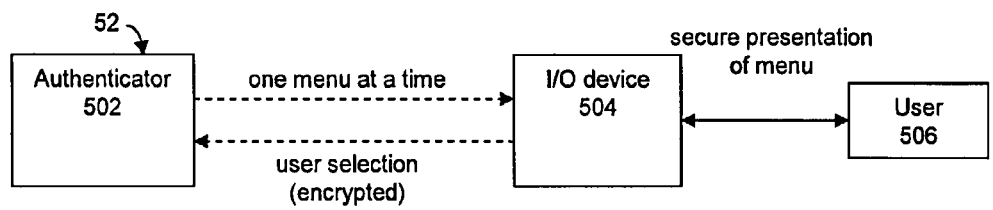
FIG. 5B is a diagram showing a second exemplary remote-local-based system for secure pass-set entry using order dependent pass-entry menus, in accordance with another embodiment of the present invention.
Figure 5C:
FIG. 5C is a diagram showing a third exemplary remote-local-based system for secure pass-set entry using pre-defined set of pass-set entry menus, in accordance with yet anther embodiment of the present invention.

Referring to FIGS. 5A-5C, there are shown first 51, second 52 and third 53 exemplary remote-local-based systems, according to an embodiment of the present invention, in which an authentication procedure between a remote authenticator 502 and a local I/O device 504 is performed using a set of one or more pass-set entry menus. All three exemplary systems comprise a remote authenticator 502 configured to control a pass-set-protected resource, and a local electronic input/output (I/O) device 504 configured to provide an environment to the user 506 for securely entering pass-set. Data transmissions between the authenticator 502 and the I/O device 504 may be encoded or encrypted to increase the security. For example, a data transmission protocol comprising substantially high level of security should be used for transporting the meta-data and the user entered pass-set or selection. The authentication application installed on the authenticator 502 may also include various security measures, to increase the security confidence of the authentication process performed by these three exemplary systems.

In the first system 51, each of the one or more pass-set entry menus is independent to each other. Therefore, the meta-data for generating all of the menus is encoded and sent from the remote authenticator 502 to the I/O device 504 at once. The user 506 makes a selection (e.g., item number of the selected item) in each of the menus until a user entered pass-set is assembled in the I/O device 504. Then the user entered selections are optionally encoded before being sent back to the remote authenticator 502.

Figure 2H:
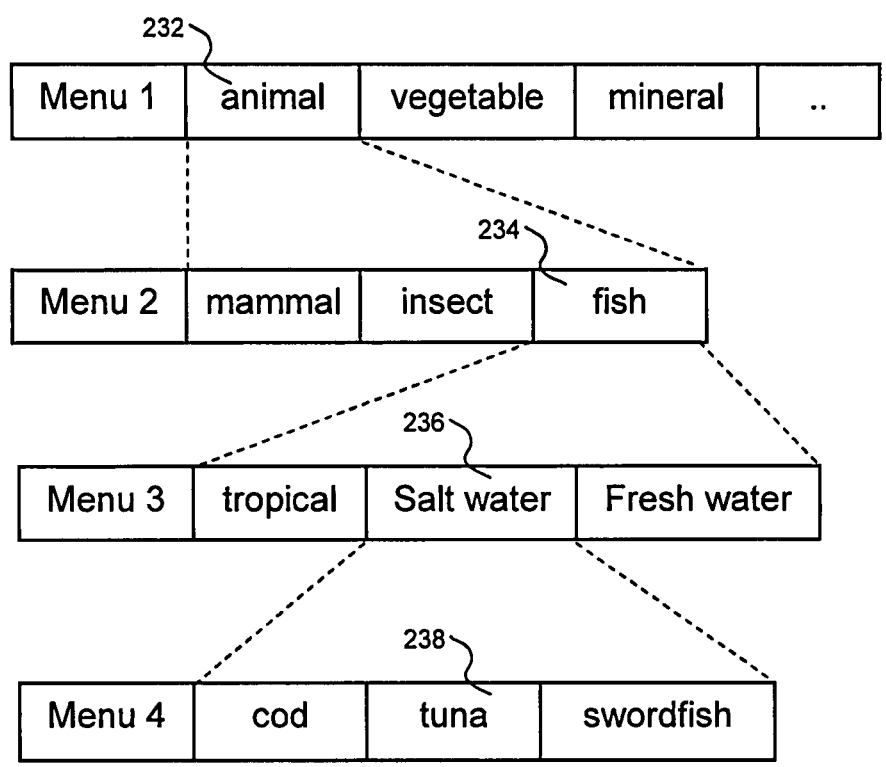
FIG. 2H is a diagram showing an exemplary set of pass-set entry menus that is order dependent, that is, a current menu is dynamically created based on the selection a user makes from a previous menu.

In the second system 52, the pass-set entry menus are order dependent (e.g., FIG. 2H and FIG. 3C). The meta-data for generating the pass-set entry menus is encoded and sent from the remote authenticator 502 to the I/O device 504 one menu at a time. The user selection or item number is transmitted back to the authenticator 502 after the user 506 makes a selection in each menu.

The third system 53 is similar but different from the first 51 and the second 52 systems. The one or more pass-set entry menus are pre-determined in the third system 53. Therefore, the meta-data does not need to be sent from the remote authenticator 502. One or more pass-set entry menus are created in the I/O device 504 based on the pre-determined scheme. For example, analogous to a bicycle combination lock, when each of the four positions of the pass-set contains only numeric digits, the I/O device 504 can create a pass-set entry menu for each position with a aural signal containing numerical digits 0, 1, 2, . . . , 9. In other words, the wearer of a headset hears an audio message containing: one, two, three, etc., in the headphone as the wearer traverses the menu (e.g., using a scroll bar or up/down buttons on the headset). The wearer then manipulates one of the control buttons or switches on the headset to make a selection. The user entered selections or item numbers are assembled and optionally encoded in the I/O device 504 before sending back the remote authenticator 502.

Figure 5D:
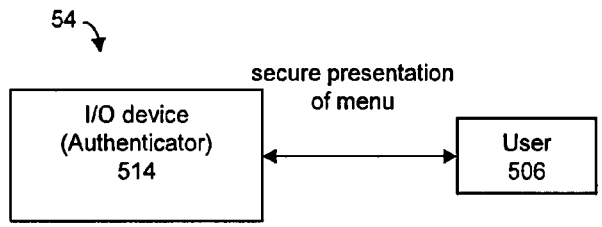
FIG. 5D is a diagram showing an exemplary local-only system for secure pass-set entry, in accordance with still another embodiment of the present invention.

In contrast to remote-local-based systems, FIG. 5D shows an exemplary local-only system 54 in which a pass-entry I/O device 514 is also an authenticator. A user 506 conducts an authentication procedure similar to one of systems 51, 52 and 53 except there is no need to transmit meta-data and user entered pass-set back and forth.

Figure 6A:
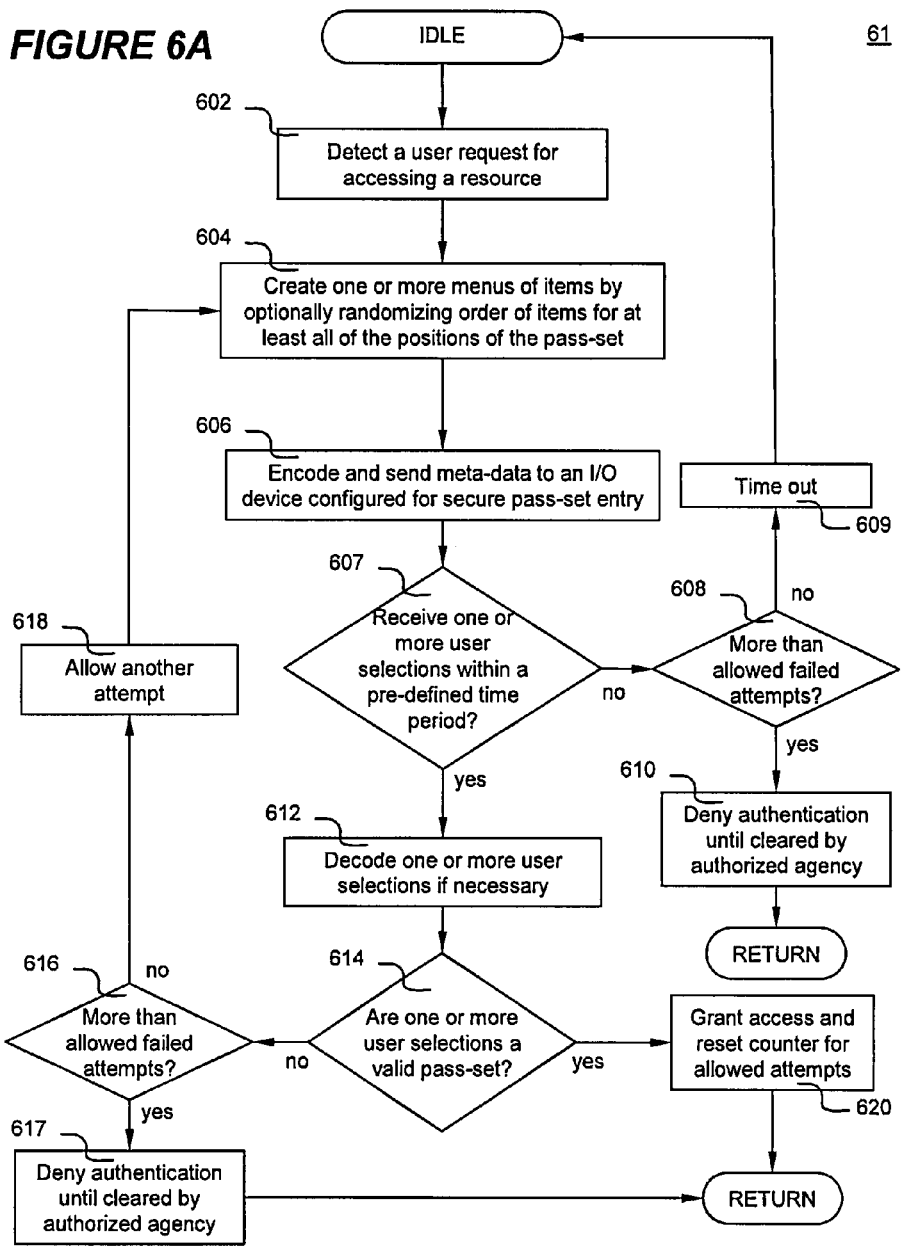
FIG. 6A is a flowchart illustrating an exemplary process by which the authenticator in FIG. 5A operates to authenticate a user, in response to the user's request to access the resource, according to an embodiment of the present invention.

FIG. 6A is a flowchart illustrating a first exemplary process 61 by which a remote authenticator 502 of FIG. 5A authenticates a user 506 over a local pass-entry I/O device 504, in response to the user's request to access the resource controlled by the remote authenticator 502, according to an embodiment of the present invention system.

During an idle state in which the authenticator 502 waits for user's request for accessing pass-set protected resources controlled by the authenticator 502. The process 61 holds in this idle state until the authenticator 502 detects a request to access a pass-set protected resource by a user 506. Once the authenticator 502 detects the user's request at step 602, at step 604 one or more pass-set entry menus are created based on the real pass-set for the user 506 for the requested resource. The number of items in the menus may be varied and the order of the items is optionally randomized. Then the authenticator 502 encodes and sends meta-data for generating the one or more pass-set entry menus to the I/O device 504 in the manner described in the first exemplary system 51.

After the meta-data is sent out at step 606, the authenticator 502 is waiting for receiving a user entered pass-set from the I/O device 504 at decision 607, in which it is determined whether a user entered pass-set in form of one or more user selections (e.g., item numbers) is received in a pre-defined time period. If "no", the process 61 moves to another decision 608 to determine if the number of pass-set entry attempts has exceeded the allowable number of attempts. If "yes", at step 610 the user 506 is denied access to the resource until an authorized agency (e.g., a reset by a higher authority, etc.)

clears the situation. The process 61 returns to the idle state waiting for another request. Otherwise, the process 61 follows the 'no' branch to step 609, the authenticator 502 issues a time out message to the I/O device 504. As a result, the process 61 moves back to the idle state waiting for another user request.

If the result of decision 607 is "yes", at step 612 the one or more user selections are received and decoded, if the received selections have been encoded. Next, at decision 614, it is determined whether the one or more received user selections are valid pass-set. If "no", the process 61 moves to another decision 616, in which it is determined if the number of pass-set entry attempts is more than the allowable. If "yes", the user 506 is denied access until an authorized agency clears the situation at step 617. The process 61 returns to the idle state waiting for another user request. Otherwise, another pass-set entry attempt is given to the user 506 at step 618, and the process 61 moves back to step 604 repeating the authentication procedure described herein until either the access of the resource is either granted or denied. In the case when an invalid user selection is detected and the user is allowed to another attempt, the process 61 may optionally generate a new pass-set entry menu that does not contain any valid selection, thus confounding further any perpetrator.

If the received user entered pass-set is correct at decision 614, the process 61 moves to step 620, in which the user 506 is granted access to the requested resource and the counter for number of allowable pass-set entry attempts is reset. The process 61 moves back to the idle state waiting for anther user request.

Referring to FIG. 6B, there is shown a flowchart illustrating a second exemplary process 62 by which a remote authenticator 502 of FIG. 5B authenticates a user 506 over a local I/O device 504, in response to the user's request to access the resource controlled by the authenticator 502, according to another embodiment of the present invention system. Many of the steps and decisions in the process 62 are the same or similar to the steps and decisions of the process 61. The difference is that the process 62 is for an authentication procedure using a set of one or more order dependent instead of order independent pass-set entry menus used in the process 61.

The process 62 holds an idle state until the authenticator 502 detects a user request at step 632. One pass-set entry menu is created at step 634. The authenticator 502 encodes and sends the meta-data for generating of the one pass-set entry menu to the I/O device 504 for the user 206 to make a selection at step 636. Then the authenticator 502 waits for receiving the user selection at decision 637 within a pre-defined time period. If "no", the process 62 moves to another decision 638. If the user 506 has attempted pass-entry more than the allowable, the result of decision 638 is "yes" and the user 506 is denied access until an authorized agency clears the situation at step 640. Otherwise, the authenticator 502 issues a time out messages to the I/O device 504 and the process 62 goes back to the idle state waiting for another request.

If "yes" is the result of decision 637, the authenticator 502 decodes the received user selection if required at step 642. Next at decision 643, it is determined whether there is another pass-set entry menu (i.e., a subsequent menu will be created dependent upon the user's selection in the current menu). If "yes" the process 62 moves back to step 634 to create the subsequent pass-set entry menu until decision 643 becomes "no". In which case, the process 62 moves to decision 644, where the received user selection is valid pass-set (e.g., comparing to the correct pass-set in a database). If "yes", the permission to access the resource is granted to the user 506 and the counter for the number of allowable pass-set entry attempts is reset at step 650. The process 62 goes back to the idle state.

Otherwise if decision 644 is "no", the process 62 moves to decision 646. It is determined whether the number of pass-set entry attempt has exceeded the number of allowed attempt. If "yes", the user is denied access until the situation can be cleared by an authorized agency at step 647 and the process 62 goes back to the idle state thereafter. Otherwise, the process 62 moves to step 648 in which the authenticator 502 allows the user 506 another pass-set entry attempt. As a result, the process 62 moves back to 634 to repeat the authentication procedure until either the permission is granted or denied.

Figure 6C:
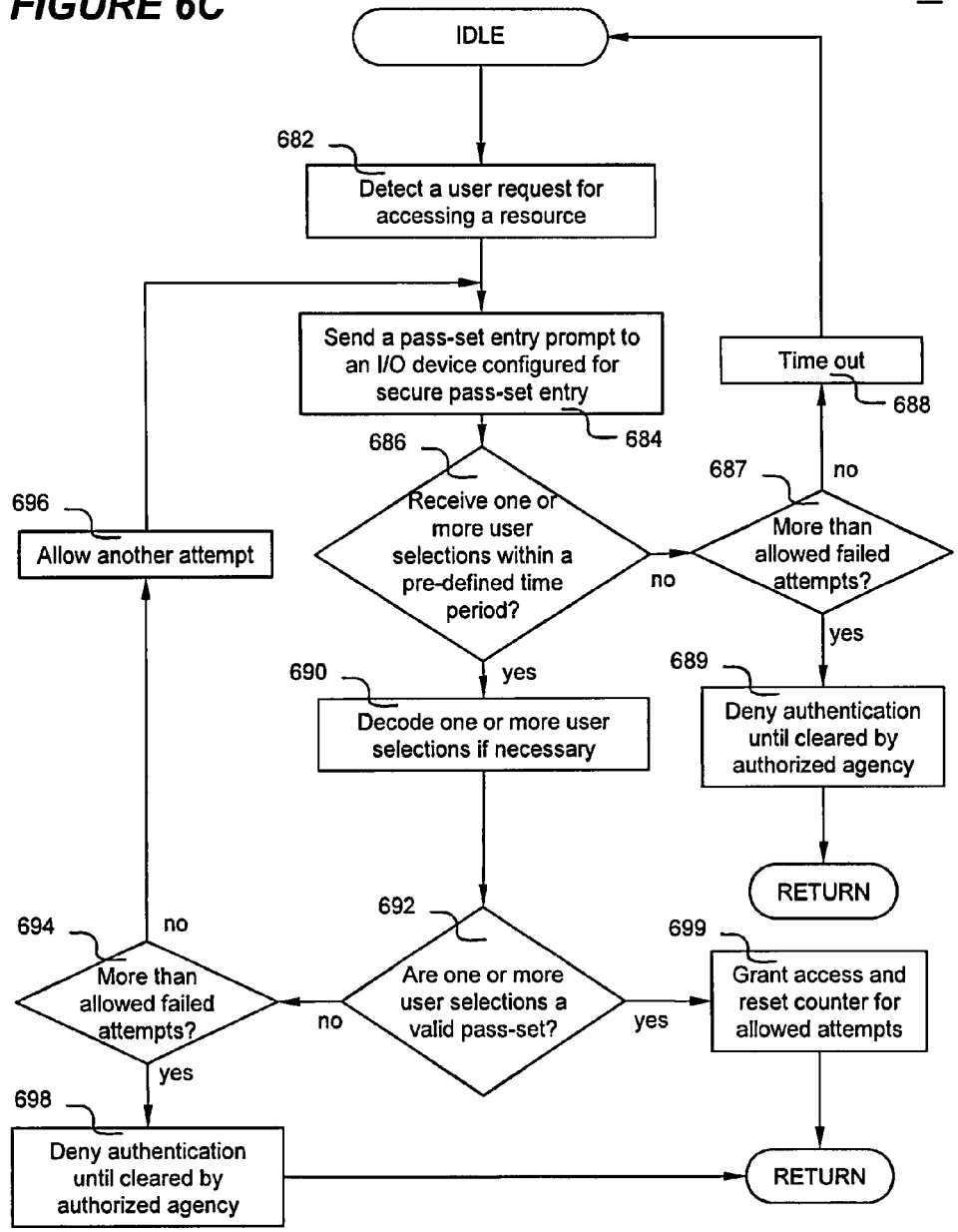
FIG. 6C is a flowchart illustrating an exemplary process by which the authenticator in FIG. 5C operates to authenticate a user, in response to the user's request to access the resource, according to an embodiment of the present invention.

FIG. 6C is a flowchart illustrating a third exemplary process 63 of the remote authenticator 502 for securely entering pass-set in the third exemplary system 53 of FIG. 5C in accordance with yet another embodiment of the present invention.

Same as the processes 61 and 62, the process 63 holds an idle state waiting for user requests for accessing pass-set protected resources controlled by the authenticator 502. Once the authenticator 502 detects a user request at step 682, a pass-set entry prompt is sent to the I/O device 504 at step 684. Then the process 63 moves to decision 686, in which authenticator 502 waits for receiving one or more user selections (e.g., item numbers) within a pre-defined period of time. If "no", the process 63 moves to decision 687 in which it is determined whether the number of pass-set entry attempts have exceeded the allowable. If "yes", the user 506 is denied permission to access the resource and the counter for allowable pass-set attempts is reset at step 689. The process 63 returns to the idle state. Otherwise if "no" at decision 687, a time out message is sent to the I/O device 504 at step 688 and the process 63 returns to the idle state thereafter.

Referring back to decision 686, if "yes", at step 690 one or more user selections are decoded if required. Then the process 63 moves to anther decision 692 in which it is determined whether the one or more received user selections are valid pass-set. If "yes" the permission to access the resource is granted and the counter for the number of allowable pass-set entry attempts is reset at step 699. The process 63 returns to the idle state. Otherwise if decision 692 is "no", the process 63 moves to yet anther decision 694. Again it is determined whether the number of pass-set entry attempts is more than the allowable. If "yes" the access to the resource is denied until it can be cleared by an authorized agency at step 698 and the process 63 returns to the idle state. Otherwise, the process moves to step 696 in which another pass-set entry attempt is given to the user 506. The process 63 moves back to step 684 to repeat the authentication procedure described herein until either permission or denial of access to the resource is determined.

Figure 7A:
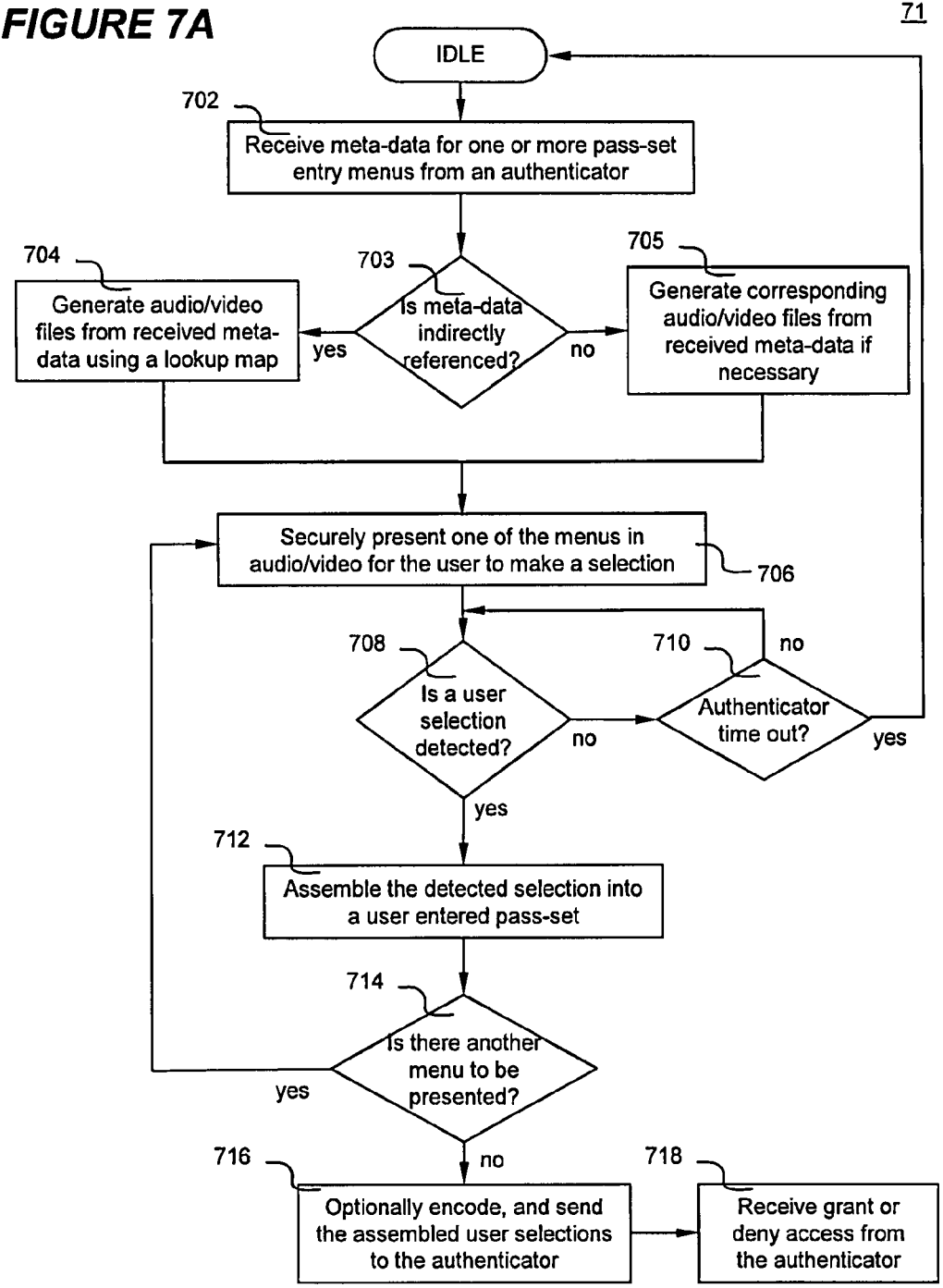
FIG. 7A is a flowchart illustrating an exemplary process by which the I/O device of FIG. 5A operates to securely present messages containing one or more pass-set entry menus and detect a user selection in each of the menus, according to an embodiment of the present invention.

Referring to FIG. 7A, there is shown a flowchart showing a first exemplary process 71 in which the local I/O device 504 of FIG. 5A generates and securely presents one or more order independent pass-set entry menus to the user 506 of the I/O device 504 to make a selection, according to an embodiment of the present invention.

The process 71 holds an idle state until a data communication interface of the I/O device 504 receives meta-data for generating one or more pass-set entry menus from the authenticator at step 702. Next at decision 703, it is determined if the received meta-data for creating menus is indirectly referenced. If "yes", at step 704, each of the received item data indices is converted into a corresponding item data based on a pre-defined lookup map or table stored in a memory device. Then corresponding audio and/or video files for the item data are generated to form aural and/or visual messages that represent the one or more pass-set entry menus. Otherwise if "no", the received meta-data is directly reference hence no conversion is required. However, the received meta-data may need to be converted to either audio or video files if necessary at step 705. For example, when the received meta-data is in form of text or phoneme files, corresponding "way" files will be generated. Then aural and/or visual messages representing the one or more pass-set entry menus are generated. Operations of steps 704 and 705 are performed by a processor together with an authentication application installed thereon.

Either step 704 or 705 is followed by step 706, in which generated output message containing one of the one or more pass-set entry menus is securely presented to the user 506 of the I/O device 504 via the output interface. Then the I/O device 504 waits for the user 506 to make a selection from the menu by manipulating a user-controls interface. Next, the process 71 moves to decision 708, in which it is determined if a user selection is detected. If "no", the process 71 moves to anther decision 710. If a time out message has been issued by the remote authenticator 502, the process 71 returns to the idle state waiting for receiving new meta-data from the authenticator 502. Otherwise, the process 71 moves back to decision 708 until either a user selection detected or an authenticator time out message received. If "yes" at decision 708, the detected user selection (e.g., item number) is assembled into a user entered pass-set (i.e., one or more user selections) at step 712. Next, at decision 714 it is determined whether there is another one of the one or more pass-set entry menus to be presented. If 'yes", the process 71 moves back to step 706 repeating the securely presentation and the user selection process described herein until the result of decision 714 becomes "no". At step 716, the one or more newly assembled user selections are optionally encoded and sent to the authenticator 502. Finally, the process 71 ends at step 718 when the request for access of the resource is either granted or denied by the authenticator 502.

Figure 7B:
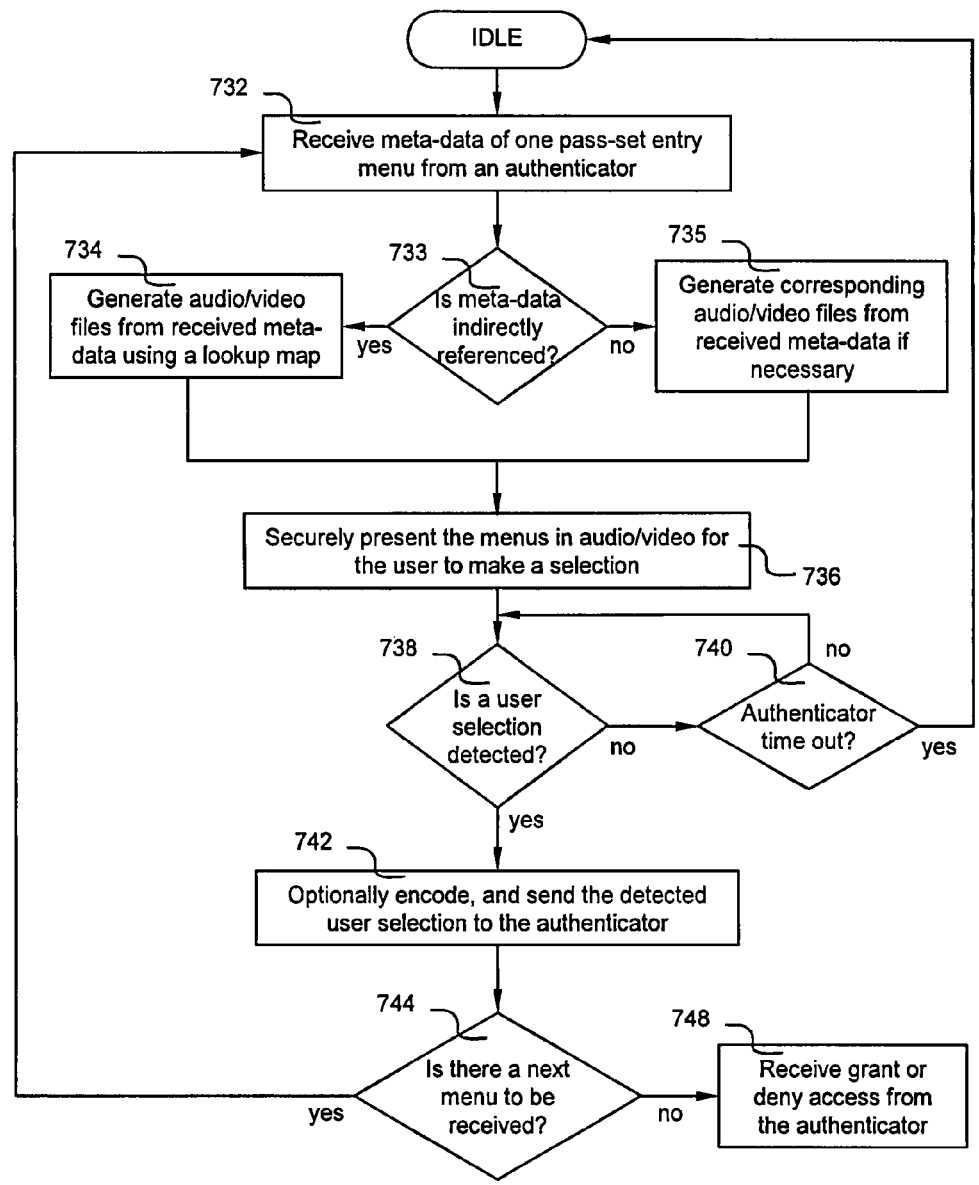
FIG. 7B is a flowchart illustrating an exemplary process by which the I/O device of FIG. 5B operates to securely present messages containing one or more pass-set entry menus and detect a user selection in each of the menus, according to an embodiment of the present invention.

FIG. 7B is a flowchart illustrating a second exemplar process 72 by which the I/O device 504 generates and securely presents one or more order dependent pass-set entry menus to the user 506 of the I/O device 504 to make a selection, according to another embodiment of the present invention. Many of the steps and decisions in the process 72 are the same or similar to the steps and decisions in the process 71.

Because the one or more pass-set entry menus used in the process 72 is order dependent, instead of receiving meta-data of creating all of the one or more pass-set entry menus from the authenticator 502. Only one menu is received each time at step 732. Steps 734, 735 and 736, and decisions 733, 738 and 740 of the process 72 are analogous to corresponding steps 704, 705 and 716, and decisions 703, 708 and 710. The difference starts when the process 72 follows the "yes" branch of decision 738 to step 742, in which the I/O device 504 optionally encodes and sends the user selection to the authenticator 502. Next at decision 744, it is determined whether a subsequent menu (i.e., a subsequent menu that is created by the authenticator based on the user selection for the current menu) is received. If "yes", the process 72 moves back to step 732 repeating the generation and secure presentation of the new menu for a user selection until the result of decision 744 becomes "no". Then the process 72 ends at step 748 in which the request for access of the resource is either granted or denied by the authenticator 502.

Figure 7C:
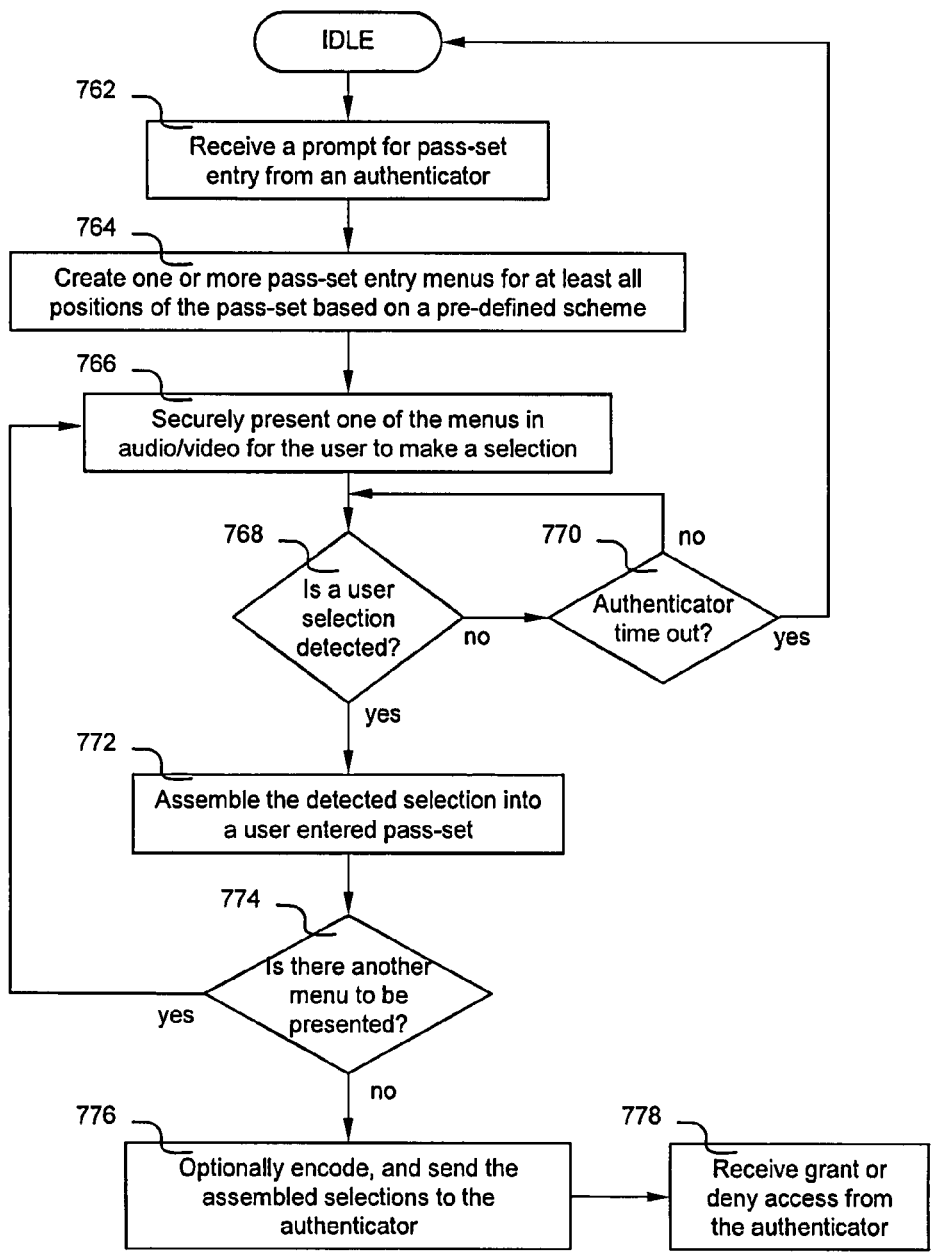
FIG. 7C is a flowchart illustrating an exemplary process by which the I/O device of FIG. 5C operates to securely present messages containing one or more pass-set entry menus and detect a user selection in each of the menus, according to an embodiment of the present invention.

FIG. 7C is a flowchart showing a third exemplary process 73 by which the I/O device 504 of the third system 53 generates and securely presents one or more pass-set entry menus to the user 506 of the I/O device 504 to make a selection, according to yet another embodiment of the present invention.

The process 73 holds an idle state till the I/O device 504 receives a pass-set entry prompt from the authenticator 502 at step 762. Next at step 764 one or more pass-set entry menu is created by the I/O device 504 in a pre-defined scheme (i.e., without the requirement of receiving meta-data from an authenticator). Then the one or more pass-set entry menus are securely presented to the user 506 in aural and/or visual messages at step 766 to make a selection. The process 73 moves to decision 768 in which it is determined whether the user selection is detected. If "no" the process 73 moves to decision 770 to determine whether a time out message has been issued by the authenticator 502. If "yes", the process 73 returns to the idle state waiting for another prompt. Otherwise, the process 73 moves back to decision 768 until either a user selection detected or a time out message received. If the result of decision 578 is "yes", the user selection is assembled into a user entered pass-set (i.e., one or more user selections) at step 772. Next at decision 774, it is determined whether there is another menu to be presented to the user 506. If "yes", the process 73 moves back to step 766 repeating the menu presentation and selection procedure until there is no more menu thereby the result of decision 774 becomes 'no". At step 776, the one or more newly assembled user selections are optionally encoded and sent to the authenticator 502. Finally the process 73 ends as the I/O device 504 receives permission or denial of access of the resource at step 778.

Figure 8:
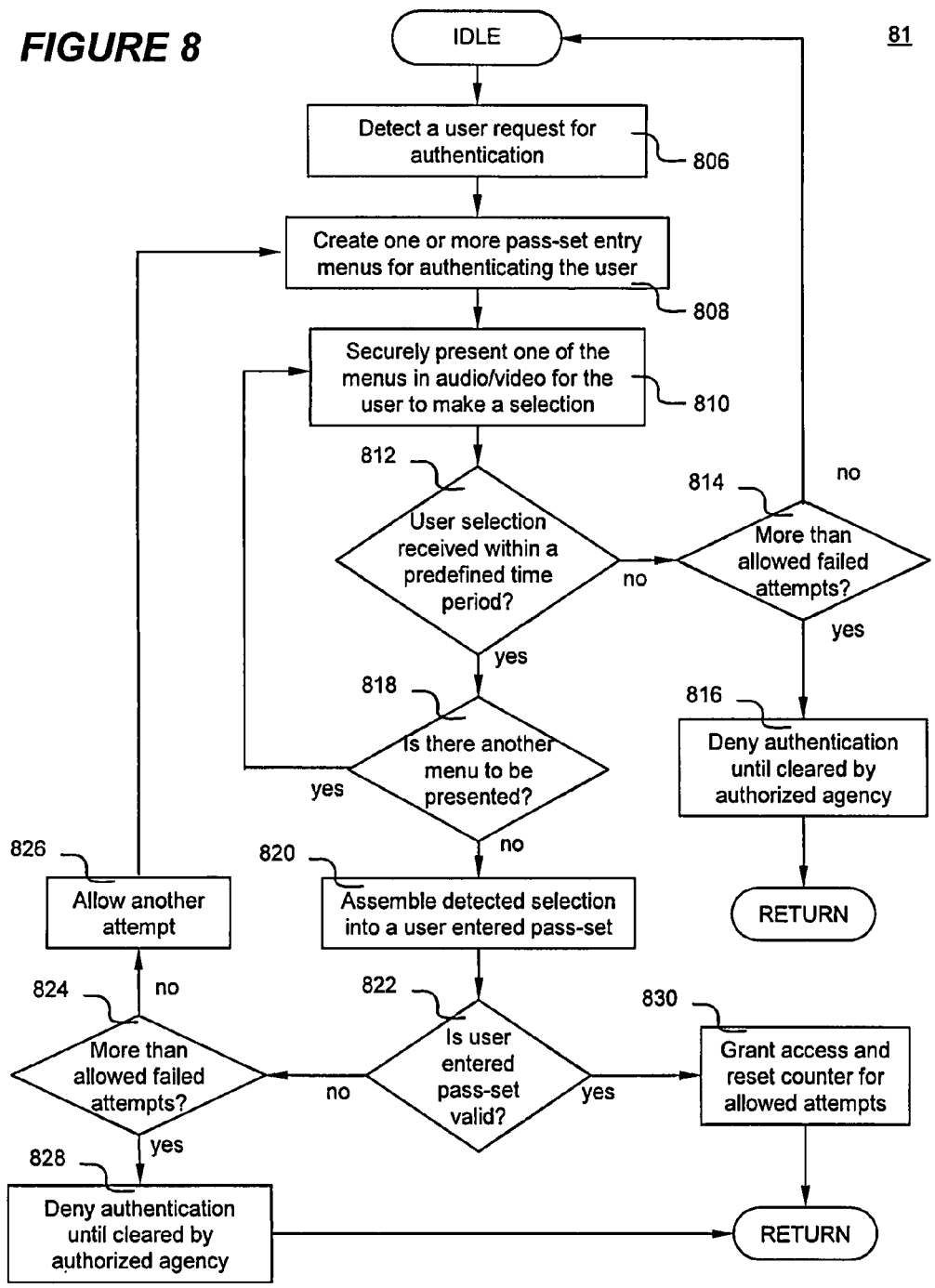
FIG. 8 is a flowchart illustrating an exemplary process by which the I/O device of FIG. 5D operates to securely present messages containing one or more pass-set entry menus and detect a user selection in each of the menus, according to an embodiment of the present invention.

Referring to FIG. 8, there is shown a flowchart illustrating an exemplary process 81 by which an I/O device 514 also an authenticator authenticates a user 506, according to an embodiment of the present invention. The process 81 is preferably understood in conjunction with previous figures especially FIG. 5D.

The process 81 holds an initial idle state until the I/O device 514 detects a user's request at 806. Next at step 808, the I/O device 514 creates one or more pass-set entry menus. Then the aural and/or visual messages containing one of the pass-set entry menus are generated and securely presented to the user 506 for a selection at step 810. The process 81 moves to decision 812, in which it is determined whether a user selection has been received in a pre-defined period of time. If "no", the process 81 moves to decision 814, in which the number of pass-set entry attempts is compared with the allowable. If it is less than the allowable, the process 81 moves back to the idle state. Otherwise, the authentication is denied until an authorized agency to clear at step 816 before the process returns to the idle state.

If the result of decision 812 is "yes", then the process 81 moves to decision 818. When there is another menu to be presented, the process 81 moves back to step 810 repeating the procedure for securely presenting menu and detecting a user selection from the present menu until decision 818 turns to "no". Then the I/O device 514 assembles detected selections into a user entered pass-set at step 820. Next at decision 822, it is determined whether the user entered pass-set is valid. If "no", the process 81 moves to decision 824 to determine if the number of pass-set entry attempts has exceeded the allowable. If so, the process 81 follows the "yes" branch to step 828. The user 506 is denied authentication until cleared by an authorized agency before the process 81 returns to the idle state. Otherwise, the process 81 moves to step 826 to allow another pass-set entry attempt. The process 81 moves back to step 808 repeating the authentication procedure described herein again.

If the result of decision 822 is "yes", the user 506 is granted access and the counter for the number of pass-set entry attempts is reset at step 830 before the process 81 returns to the idle state.

Although the present invention has been described with reference to specific embodiments thereof, these embodiments are merely illustrative, and not restrictive of, the present invention. Various modifications or changes to the specifically disclosed exemplary embodiments will be suggested to persons skilled in the art. For example, while the I/O device has been shown and described as a headset comprising a binaural headphone having a headset top that fits over a user's head, other headset types including, without limitation, monaural, earbud-type, canal-phone type, etc. may also be used. Depending on the application, the various types of headsets may include or not include a microphone for enabling voice recognition. Moreover, while some of the exemplary embodiments have been described in the context of a headset, those of ordinary skill in the art will readily appreciate and understand that the methods, system and apparatus of the invention may be adapted or modified to work with other types of head-worn electronic devices such as personal heads-up display device or a haptic device that vibrates choices. In summary, the scope of the invention should not be restricted to the specific exemplary embodiments disclosed herein, and all modifications that are readily suggested to those of ordinary skill in the art should be included within the spirit and purview of this application and scope of the appended claims.

What is claimed is:

1. A method of providing secure pass-set entry in an input/output (I/O) device, comprising:
    generating aural messages containing one or more pass-set entry menus, in response to a request by a user of the I/O device to access a pass-set protected resource, wherein each pass-set entry menu comprises a plurality of user selectable menu items, and wherein a position within the one or more pass-set entry menus of an element of a user pass-set as a user selectable menu item to be output aurally is randomized for each pass-set entry session; and
    securely presenting the messages at a headset speaker of the I/O device for the user to make a selection from each of the one or more pass-set entry menus; and
    receiving a user selection via a user-controls interface of the I/O device of a menu item from the plurality of user selectable menu items, the menu item being an element of the user pass-set.

2. The method of claim 1, further comprising:
    receiving meta-data for generating one or more pass-set entry menus from an authenticator; and
    de-referencing the received meta-data according to a pre-defined lookup map if the received meta-data are indirectly referenced.

3. The method of claim 1, further comprising assembling the selection into a user entered pass-set.

4. The method of claim 3, further comprising:
    encoding the assembled user entered pass-set; and
    sending the assembled user entered pass-set to the authenticator.

5. A headset adapted to gain access to a secure system, comprising:
    a microprocessor controlled pass-set program configured to receive pass-set request information from an authenticator, said microprocessor controlled pass-set program including instructions for generating a plurality of pass-set prompt signals from the pass-set request information, the plurality of pass-set prompt signals comprising one or more pass-set entry menus, wherein each pass-set entry menu comprises a plurality of user selectable menu items, and wherein a position within the one or more pass-set entry menus of an element of a user pass-set as a user selectable menu item is randomized for each pass-set entry session;
    an output user interface configured to output a plurality of user-sensible pass-set prompts to a wearer of the headset from the plurality of pass-set prompt signals generated by said microprocessor controlled pass-set program;
    a user-controls interface configured to receive selection information from the headset wearer in response to the plurality of user-sensible pass-set prompts, the selection information comprising a user selection of a menu item, the menu item being an element of the user pass-set; and
    a transceiver configured to transmit signals representing the headset wearer's response to the plurality of user-sensible pass-set prompts to the authenticator of the secure system.

6. The headset of claim 5 wherein the signals representing the headset wearer's response to the plurality of user-sensible pass-set prompts correspond to a pass-set for gaining access to the secure system.

7. The headset of claim 5 wherein the output user comprises one or more electroacoustic devices, and the user-sensible pass-set prompts comprise audible pass-set prompts that are heard by the wearer.

8. The headset of claim 5 wherein the output user interface comprises a heads-up display (HUD), and the user-sensible pass-set prompts comprise visual pass-set prompts that are seen by the wearer.

9. The headset of claim 5 wherein the output user interface comprises one or more haptic devices, and the user-sensible pass-set prompts comprise tactile pass-set prompts that are felt by the wearer.

10. A headset device for secure pass-set entry, comprising:
    a processor;
    a memory storing an authentication application configured to generate a plurality of pass-set entry menus to output to a user in aural form responsive to a request by a user of the headset device to access a pass-set protected resource, wherein each menu of the plurality of pass-set entry menus comprises a plurality of user selectable menu items wherein one item of the plurality of user selectable menu items is an element of a user pass-set and a position of the element of the user pass-set is randomized for each pass-set entry session;
    an output user interface configured to present each pass-set entry menu of the plurality of pass-set entry menus to the user; and
    an input user interface configured to receive a user selected menu item from each of the plurality of pass-set entry menus.

11. The headset device of claim 10, further comprising a data communication interface configured to receive meta-data from an authenticator, wherein the meta-data is utilized to generate the plurality of pass-set entry menus.

12. The headset device of claim 11, wherein the authentication application is configured to dereference the meta-data received from the authenticator according to a pre-defined lookup map if the meta-data are indirectly referenced.

13. The headset device of claim 10, wherein a total number of items in each menu of the plurality of pass-set entry menus is variable across the plurality of pass-set entry menus.

14. The headset device of claim 10, wherein an order of the items in each of the plurality of pass-set entry menus is randomized such that a user selected menu item corresponding to an element of the user pass-set is randomized for each user pass-set entry session.

15. The headset device of claim 14, wherein the output user interface is an earphone to securely present each pass-set entry menu and the input user interface is a microphone and a speech recognition system, wherein an identity of a user selected element of the user pass-set is masked to listeners when the user selected menu item is verbally spoken.

* * * * *